United States Patent
Oh

(10) Patent No.: US 12,162,457 B2
(45) Date of Patent: Dec. 10, 2024

(54) SYSTEM FOR FORWARD COLLISION AVOIDANCE OF VEHICLE PASSING LOW SPEED LIMIT AREA AND METHOD THEREOF

(71) Applicant: HYUNDAI MOBIS CO., LTD., Seoul (KR)

(72) Inventor: Jun Hyeong Oh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 193 days.

(21) Appl. No.: 17/356,909

(22) Filed: Jun. 24, 2021

(65) Prior Publication Data

US 2021/0402966 A1    Dec. 30, 2021

(30) Foreign Application Priority Data

Jun. 26, 2020    (KR) .................. 10-2020-0078561

(51) Int. Cl.
*B60T 8/171*    (2006.01)
*B60W 50/00*    (2006.01)
(Continued)

(52) U.S. Cl.
CPC ............ *B60T 8/171* (2013.01); *B60T 2210/32* (2013.01); *B60W 2050/0088* (2013.01);
(Continued)

(58) Field of Classification Search
CPC ........ B60T 8/171; B60T 2210/32; B60T 7/22; B60T 2201/022; B60W 50/0098;
(Continued)

(56) References Cited

U.S. PATENT DOCUMENTS 10,239,450 B1 *   3/2019   Englander ............... B60Q 5/005
10,435,018 B2 *   10/2019   Kim ....................... B60W 30/09
(Continued)

FOREIGN PATENT DOCUMENTS

CN    106164798 A    11/2016
CN    108615407 A    10/2018
(Continued)

OTHER PUBLICATIONS

KR-20120140062-A Translation (Year: 2012).*
(Continued)

*Primary Examiner* — Kyle T Johnson
(74) *Attorney, Agent, or Firm* — NSIP Law

(57) ABSTRACT

A system for vehicle forward collision avoidance through a low speed limit area includes a position providing device, a sensor, and a vehicle controller. The position providing device is configured to provide information on a position of a host vehicle. The sensor is configured to detect whether an object is present in vicinity of the host vehicle. The vehicle controller is configured to: set a dangerous area based on a dangerous rank by detecting through the sensor, in a driving caution area, a motionless vehicle or a pedestrian; correct sensitivity of the sensor to be higher than an original sensitivity, after setting the dangerous area; and correct forward collision avoidance performance of the host vehicle to be increased from an original performance, when the position of the host vehicle is detected in the driving caution area through the position providing device.

15 Claims, 8 Drawing Sheets

(51) Int. Cl.
   *B60W 50/14* (2020.01)
   *B60W 50/16* (2020.01)
(52) U.S. Cl.
   CPC ... *B60W 50/0098* (2013.01); *B60W 2050/143* (2013.01); *B60W 2050/146* (2013.01); *B60W 50/16* (2013.01); *B60W 2554/20* (2020.02); *B60W 2554/4029* (2020.02); *B60W 2555/60* (2020.02)
(58) Field of Classification Search
   CPC ......... B60W 50/16; B60W 2050/0088; B60W 2050/143; B60W 2050/146; B60W 2554/20; B60W 2554/4029; B60W 2555/60; B60W 30/09; B60W 30/0953; B60W 50/14; B60W 2520/10; B60W 2554/802; B60W 2554/804; B60W 30/08; B60W 10/18; B60W 40/02; B60W 40/10; B60W 2420/00; B60W 2552/50; B60R 21/0134; B60Y 2300/08; B60Y 2400/301
   See application file for complete search history.

(56) References Cited

U.S. PATENT DOCUMENTS

| | | | | |
|---|---|---|---|---|
| 11,618,470 B2* | 4/2023 | Oh | ........................ | B60W 50/14 340/435 |
| 2014/0292502 A1* | 10/2014 | Sakima | ............. | B60W 30/0956 340/435 |
| 2015/0165997 A1* | 6/2015 | Nilsson | ............... | B60R 21/0134 701/45 |
| 2015/0334269 A1* | 11/2015 | Yokota | ................... | G08G 1/166 382/103 |
| 2017/0139418 A1* | 5/2017 | Hiramatsu | ........... | A01B 69/008 |
| 2018/0113450 A1* | 4/2018 | Sherony | ................ | B60W 10/04 |
| 2019/0054904 A1* | 2/2019 | Jang | ........................ | B60T 8/171 |
| 2019/0108753 A1* | 4/2019 | Kaiser | .................. | G08G 1/0141 |
| 2020/0023837 A1* | 1/2020 | Yokoi | ............... | B60W 30/0953 |
| 2020/0346644 A1* | 11/2020 | Schmeichel | .......... | B60W 30/12 |
| 2020/0369294 A1* | 11/2020 | Jeon | ...................... | B60W 50/14 |
| 2021/0009158 A1* | 1/2021 | Kim | ................... | G01C 21/3492 |
| 2021/0107488 A1* | 4/2021 | Jeong | .................... | B60W 40/10 |
| 2021/0110716 A1* | 4/2021 | Becker | .................. | G08G 1/166 |
| 2021/0394778 A1* | 12/2021 | Oh | ........................ | B60W 30/09 |
| 2022/0024479 A1* | 1/2022 | Mell | ....................... | B60W 50/16 |
| 2022/0335826 A1* | 10/2022 | Tsuda | .................... | B60W 30/18 |

FOREIGN PATENT DOCUMENTS

| | | | | |
|---|---|---|---|---|
| CN | 108944943 B | * | 4/2020 | .......... B60W 30/165 |
| CN | 113895433 A | | 1/2022 | |
| JP | 4485193 B2 | * | 6/2010 | ............. B60T 7/042 |
| KR | 20120140062 A | * | 12/2012 | |
| KR | 10-2014-0122804 A | | 10/2014 | |
| KR | 20140122804 A | * | 10/2014 | ............ B60W 40/04 |
| KR | 20170040604 A | * | 4/2017 | ............ B60W 30/08 |
| KR | 10-2018-0071575 A | | 6/2018 | |
| KR | 10-2019-0083789 A | | 7/2019 | |

OTHER PUBLICATIONS

KR-20170040604-A translation (Year: 2017).*
KR-20140122804-A translation (Year: 2014).*
CN-108944943-B translation (Year: 2020).*
JP-4485193-B2 translation (Year: 2010).*
Road Sign Speed Limit Sign with Children at Play (Year: 2020).*
Chinese Office Action issued on Jun. 14, 2023, in counterpart Chinese Patent Application No. 202110714640.9 (9 pages in English, 11 pages in Chinese).

* cited by examiner

SYSTEM FOR FORWARD COLLISION AVOIDANCE OF VEHICLE PASSING LOW SPEED LIMIT AREA AND METHOD THEREOF

CROSS-REFERENCE TO RELATED APPLICATION

This application claims the benefit under 35 USC 119(a) of Korean Patent Application No. 10-2020-0078561, filed in the Korean Intellectual Property Office on Jun. 26, 2020, the entire disclosure of which is incorporated herein by reference for all purposes.

TECHNICAL FIELD

The present disclosure relates to a system for forward collision avoidance of a vehicle passing a low speed limit area and a method thereof, and more particularly, to a system for forward collision avoidance of a vehicle passing a low speed limit area and a method thereof, capable of more rapidly coping with the collision with a pedestrian rushed toward a road from a sidewalk or rushed out between parked and stopped vehicles by changing a parameter of the system for forward collision avoidance of the vehicle, when the vehicle passing the low speed limit area recognizes the parked or stopped vehicle or the pedestrian on the sidewalk.

BACKGROUND

In general, a driver may face a number of unexpected dangerous situations during driving due to reasons, such as drowsy driving, inexperienced driving, violent driving, and road conditions, of the driver or another person.

Accordingly, Advanced Driver Assistance Systems (ADAS) have been developed to assist driving safety by allowing the vehicle to determine some of the dangerous situations that occur during driving.

For example, among ADAS technologies, lane following assist (LFA), lane keeping assist (LKA), and Forward Collision Avoidance Assist (FCA), which are, also applied to an autonomous vehicle, are functions to assist a driver to more safely drive the vehicle.

Among them, the FCA is a driving safety system that warns the driver of danger and controls the braking of the vehicle to prevent the collision with an obstacle in front of the vehicle while driving.

However, a typical FCA has to find out an appropriate value between malfunction and non-operation. When a relevant parameter is get to be excessively sensitive, the malfunction may be caused. To the contrary, when the relevant parameter is set to be slightly sensitive, the non-operation may be caused.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system for vehicle forward collision avoidance through a low speed limit area includes a position providing device, a sensor, and a vehicle controller. The position providing device is configured to provide information on a position of a host vehicle. The sensor is configured to detect whether an object is present in vicinity of the host vehicle. The vehicle controller is configured to: set a dangerous area (i.e., a risk area) based on a dangerous rank (i.e., a risk rank) by detecting through the sensor, in a driving caution area, a motionless vehicle or a pedestrian; correct sensitivity of the sensor to be higher than an original sensitivity, after setting the dangerous area; and correct forward collision avoidance performance of the host vehicle to be increased from an original performance, when the position of the host vehicle is detected in the driving caution area through the position providing device.

The vehicle controller may be further configured to detect the host vehicle entering the low speed limit area, through the position providing device.

The vehicle controller may be further configured to set, to a first dangerous area, an area of the driving caution area in which any one of the motionless vehicle or the pedestrian is present, and set, to a second dangerous area more dangerous than the first dangerous area, an area in which the motionless vehicle and the pedestrian are present.

The vehicle controller may be further configured to differentially change the sensitivity of the sensor, depending on the dangerous rank of the dangerous area.

The vehicle controller may be further configured to differentially change force for braking the host vehicle or a time point to brake the host vehicle, as the sensitivity of the sensor is differentially changed.

The vehicle controller may be further configured to provide audio-visual information or tactile information to a driver of the host vehicle, when detecting the motionless vehicle or the pedestrian in the dangerous area.

When the host vehicle deviates from the driving caution area through the position providing device, the vehicle controller may be further configured to restore the sensitivity of the sensor corrected to be higher to the original sensitivity and restore the forward collision avoidance performance increased to the original performance.

In another general aspect, a method for vehicle forward collision avoidance through a low speed limit area, includes detecting a host vehicle entering a driving caution area, through a position providing device providing information on a position of the host vehicle; detecting, in a driving caution area, a motionless vehicle or a pedestrian, through a sensor detecting whether an object is present in a vicinity of the host vehicle; and correcting, by a vehicle controller, sensitivity of the sensor to be higher than an original sensitivity, and forward collision avoidance performance of the host vehicle to be increased from an original performance, after setting the dangerous area based on a dangerous rank.

The detecting of the host vehicle entering the driving caution area may include detecting the host vehicle entering the to speed limit area, through the position providing device.

The detecting in the driving caution area of the motionless vehicle or the pedestrian may include setting, to a first dangerous area, an area of the driving caution area in which any one of the motionless vehicle or the pedestrian is present, and setting, to a second dangerous area more dangerous than the first dangerous area, an area in which both the motionless vehicle and the pedestrian are present.

The correcting by the vehicle controller of the sensitivity of the sensor may include differentially changing the sensitivity of the sensor, depending on the dangerous rank of the dangerous area.

The correcting by the vehicle controller of the sensitivity of the sensor may include differentially changing force for braking the host vehicle or a time point to brake the host vehicle, as the sensitivity of the sensor is differentially changed.

The correcting by the vehicle controller of the sensitivity of the sensor may include providing audio-visual information or tactile information to a driver of the host vehicle, when detecting the motionless vehicle or the pedestrian in the dangerous area.

The correcting by the vehicle controller of the sensitivity of the sensor may include restoring the sensitivity of the sensor corrected to be higher to the original sensitivity, and restoring the forward collision avoidance performance increased to the original performance, when the host vehicle deviates from the driving caution area through the position providing device.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
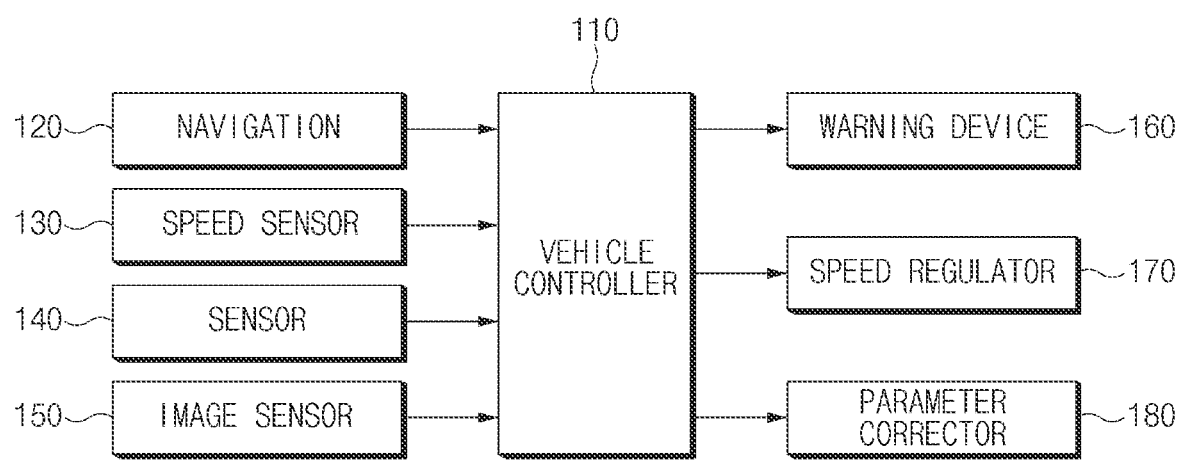
FIG. 1 is a block diagram illustrating a system for forward collision avoidance of a vehicle passing a low speed limit area, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure is to define the dangerous level with respect to when the parked or stopped vehicle is present or when the pedestrian is recognized on the sidewalk, such that the audio-visual information or tactile information is provided to a driver during the driving in the low speed limit area, thereby more rapidly coping with the collision with the pedestrian rushed out between the parked or stopped vehicles or rushed to the road out of the sidewalk by using dualized parameters (related to collision determination and braking) of the forward collision avoidance assist function. Accordingly, the collision with the pedestrian may be reduced in the situation that many parked and stopped vehicles are present in the low speed limit area and the burden of the driver may be reduced by enhancing a collision avoidance function in the low speed limit area.

Hereinafter, embodiments of the present disclosure will be described with reference to FIGS. 1 to 7 in detail.

Figure 2:
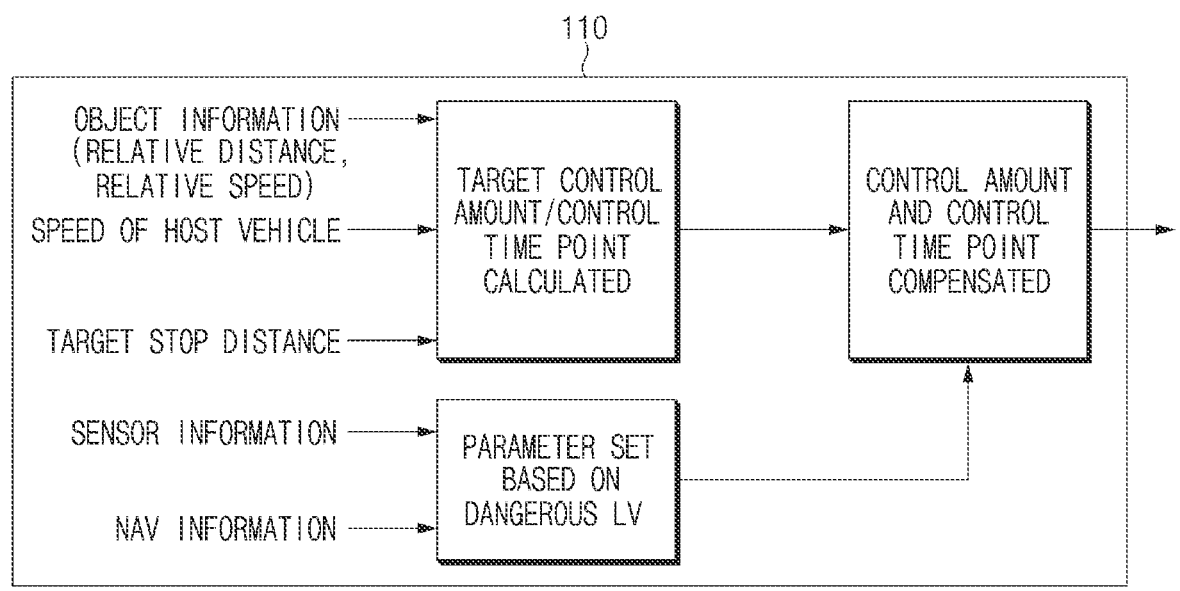
FIG. 2 is a view illustrating a procedure of calculating a compensation amount of an FCA commend by a vehicle controller consisting a system for forward collision avoidance of a vehicle passing a low speed limit area, according to an embodiment of the present disclosure.
Figure 3A:
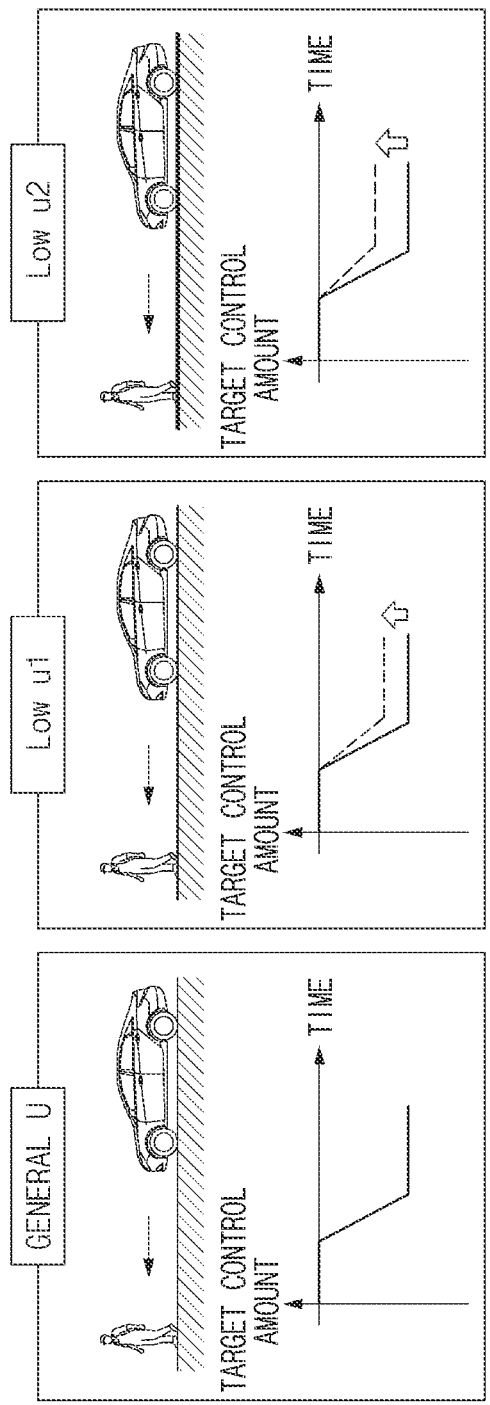
FIGS. 3A-3B are views illustrating the difference between an existing FCA command and a compensated FCA command through a system for forward collision avoidance of a vehicle passing a low seed limit area, according to an embodiment of the present disclosure.
Figure 3B:
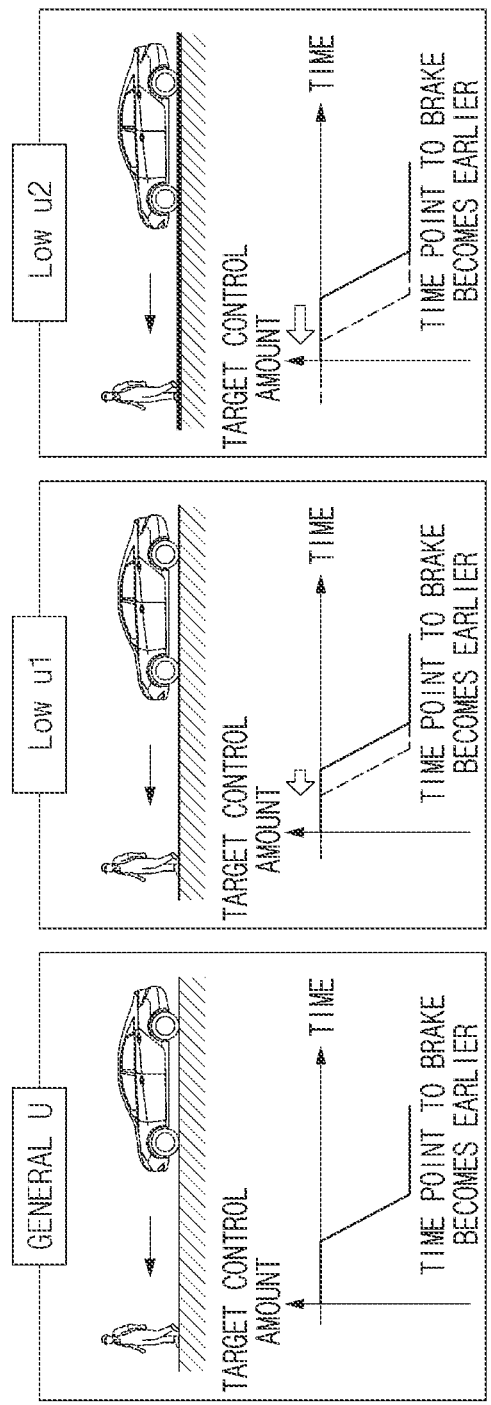
Figure 4:
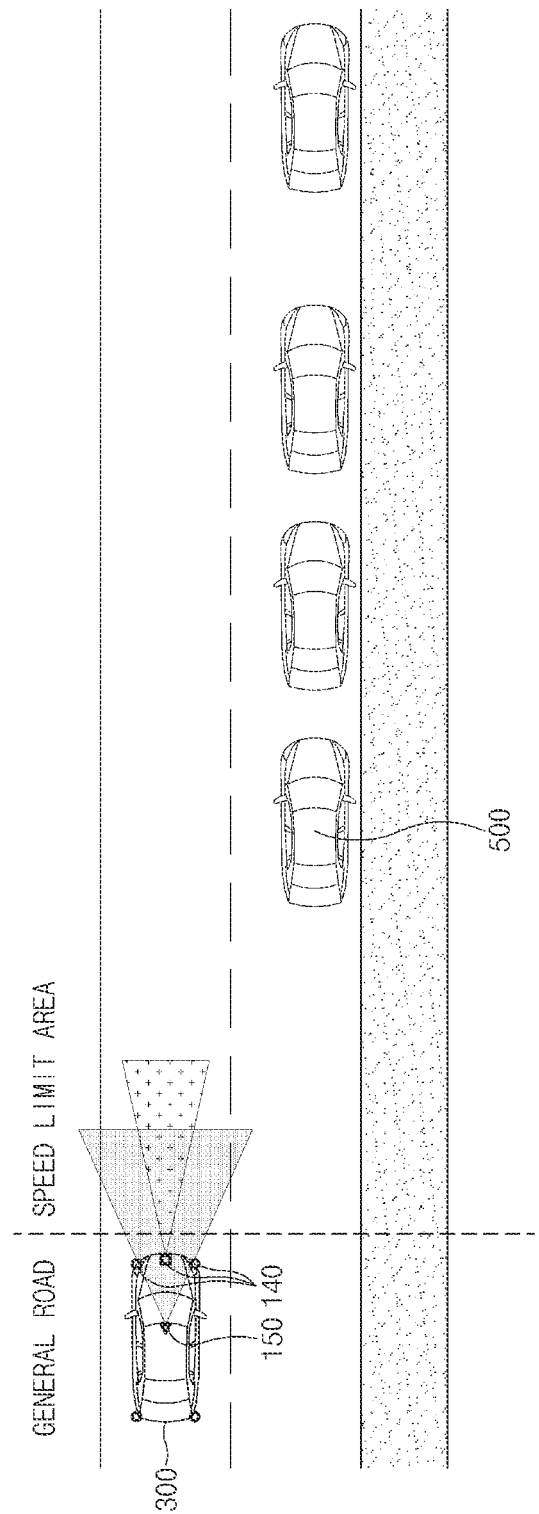
FIGS. 4 to 7 are views illustrating an operating procedure by using a system for forward collision avoidance of a vehicle passing a low speed limit area, according to an embodiment of the present disclosure.

FIG. 1 is a block diagram illustrating a system for forward collision avoidance (FCA) of a vehicle passing a low speed limit area, according to an embodiment of the present disclosure, FIG. 2 is a view illustrating a procedure of calculating a compensation amount of an FCA commend by a vehicle controller consisting a system for forward collision avoidance of a vehicle passing a low speed limit area, according to an embodiment of the present disclosure, FIGS. 3A-3B is a view illustrating the difference between an existing FCA command and a compensated FCA command through a system for forward collision avoidance of a vehicle passing a low speed limit area, according to an embodiment of the present disclosure, FIGS. 4 to 7 are views illustrating an operating procedure by using a system for forward collision avoidance of a vehicle passing a low speed limit area, according to an embodiment of the present disclosure.

Referring to FIG. 1, a system for forward collision avoidance of a vehicle passing a low speed limit area, according to an embodiment of the present disclosure may include a vehicle controller 110, a navigation 120, a speed sensor 130, a sensor 140, an image sensor 150, a warning device 160, a speed regulator 170, and a parameter corrector 130.

The navigation 120, which includes a GPS receiver to provide information on a current position of a host vehicle 300 to the vehicle controller 110, may provide, to the vehicle controller 110, information on whether the host, vehicle 300 is positioned on a general road or a low speed limit, area, such as a child protection zone or a school zone.

The speed sensor 130 includes a wheel sensor to sense a driving speed of the host vehicle 300. The speed sensor 130 may sense the rotating speed of the wheel of the host vehicle 300 and may provide information on the rotating speed to the vehicle controller 110.

The sensor 140 may include a LiDAR sensor, an ultrasonic sensor, or a radar sensor. The sensor 140 may be installed at a left side portion, a right side portion, a front portion, a rear portion, a front-left portion, a front-right portion, a rear-left portion or a rear-right portion of the host vehicle 300 to sense whether another vehicle is present or approaches the host vehicle 300, or whether a pedestrian approaches the host vehicle 300, and to provide the information on the sensing co the vehicle controller 110.

The sensor 140 may be provided at the side portion of the host vehicle 300 to sense whether a vehicle is parked or stopped on the shoulder of a road or whether a pedestrian is present, and may be provided at the front portion of the host vehicle 300 to sense a vehicle or a pedestrian positioned in front of the host vehicle 300.

The image sensor 150 may include a camera, and may be installed in any place, such as a vicinity of a rear view mirror of the host vehicle 300, positioned to obtain information on an image of an inner portion or an outer portion of the host vehicle 300 by taking the image.

The image sensor 150 may take an image of a vicinity of the host vehicle 300 while the host vehicle 300 is travelling or being stopped and may provide information, which is obtained by sensing the vehicle or the pedestrian, to the vehicle controller 110. The image sensor 150 may photograph a vehicle which is parked or stopped on the shoulder of the road, pedestrian positioned on a sidewalk, or a vehicle or a pedestrian positioned in front of the host vehicle 300. In addition, the image sensor 150 may photograph an object, which is moving, or various obstacles which are stationary.

The warning device 160 may provide, to a driver of the host vehicle 300, audio-visual information or tactile information, when a control signal is received from the vehicle controller 110, as it is determined that the host vehicle 300 enters the low speed limit area based on the information of the navigation 120. When the control signal is received from the vehicle controller 110, as a vehicle 500 is parked or stopped in the low speed limit area or a pedestrian 550 is present on the sidewalk, the warning device 160 may provide, to the driver of the host vehicle 300, the audio-visual information or the tactile information.

The warning device 160 may be configured to include a vibration device, a display, or a sound device.

The vibration device, which vibrates an object to be vibrated by using a vibration motor or an electromagnet, and is provided inside of spokes of a steering wheel or the steering wheel to vibrate the spoke of the steering wheel or the steering wheel.

The display, which outputs a warning message to a screen, may be provided on a display device or a dash board.

The display may output mutually different warning messages depending on a control signal and may provide the mutually different warning messages to the driver. For example, when the host vehicle 300 enters the low speed limit area, the display may output a message on the low speed limit area. When the parked or stopped vehicle 500 is present, the display may output a message on that the parked or stopped vehicle 500 is present, and when the pedestrian 550 is present, the display may output a message on that the pedestrian 550 is present.

The sound device, which outputs a warning message or a warning sound in the form of a sound, may output the warning message by using a voice or a person, which is recorded in advance, and the type of the warning sound may be changed depending on the selection of a designer or a driver.

The sound device may output the warning message or the warning sound by using a speaker provided in the host vehicle 300 or a speaker provided in the display device. The sound device may output mutually different warning messages in response to a control signal.

The speed regulator 170 may regulate the speed of the host vehicle 300 and may include an accelerator driving part and a brake driving part.

The speed regulator 170 may regulate a driving speed of the host vehicle 300 under the control of the vehicle controller 110. The speed regulator 170 may reduce the driving speed of the host vehicle 300 or stop the host vehicle 300, when the risk of collision between the host vehicle 300 and another object is high.

The parameter corrector 180 may be a forward collision-avoidance assist (FCA) controller, and may increase the sensitivity of the sensor 140 and the image sensor 150.

Accordingly, when the parked or stopped vehicle 500 or the pedestrian 550 is present, the sensing direction of the image sensor 150 may be changed to face a place in which the parked or stopped vehicle 500 or the pedestrian 350 positioned, under the control of the vehicle controller 110. In addition, the sensitivity of the sensor 140 may be increased to be higher. In other words, a time point to brake the host vehicle 300 may become earlier and force (braking force) for braking the host vehicle 300 may become stronger so prepare for when an object is present in front of she host vehicle 300.

The vehicle controller 110 may include an electronic control unit (ECU). When sensing that the host vehicle 300 enters the low speed limit area, through the navigation 120, the vehicle controller 110 may transmit a control signal to the warning device 160 and may notify the driver of the host vehicle 300 of that the host vehicle 300 enters the low speed limit area.

When the host vehicle 300 enters the low speed limit area, the vehicle controller 110 may control the speed regulator 170 to reduce the speed of the host vehicle 300 to a speed specified for the low speed limit area.

Referring to FIG. 2, in the procedure of calculating a compensation amount of the FCA command, the vehicle controller 110 may calculate an FCA command (that is, a braking control amount and a time point to control braking), based on information (that is, the relative distance to a pedestrian rushed into the front of the vehicle, a relative speed with respect to the pedestrian, the speed of the host vehicle 300, and a preset target stop distance) on an object.

In addition, the vehicle controller 110 may calculate a compensation value to compensate for the FCA command depending on a dangerous level, based on a plurality of vehicle sensors, for example, an accelerator sensor, a wheel speed sensor, or a weight sensor mounted on the host vehicle 300, when only the parked or stopped vehicle 500 is present, when only a pedestrian is present on a sidewalk, or when both the parked or stopped vehicle 500 and the pedestrian 550 are present.

Referring to FIGS. 3A-3B, as a dangerous level is increased in the low speed limit area (General u<Low u1<Low u2), an FCA command having a target control amount, which is more increased from a target control amount (braking control amount; normal u) in the general road as illustrated in FIG. 3A, may be output.

In addition, FIG. 3B illustrates that a target braking time point of the FCA command is compensated by reflecting the dangerous level. An FCA command having a target braking time point, which becomes earlier than the target braking time point in the general road (General u) as illustrated in FIG. 3A may be output, as the dangerous level is increased (General u<Low u1<Low u2) in the low speed limit area.

As described above, referring to FIG. 4, when the host vehicle 300 enters the low speed limit area, the vehicle controller 110 may sense whether the parked or stopped vehicle 500 is present on the shoulder of the road or the pedestrian 550 is present on the sidewalk, through the sensor 140.

Figure 5:
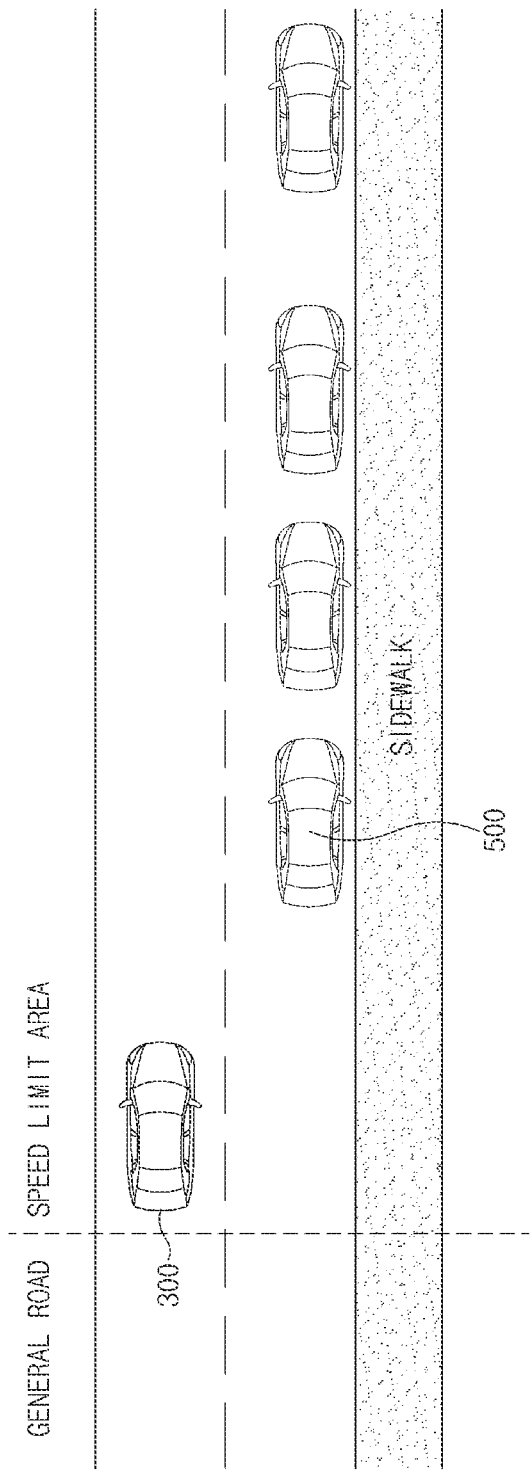
Figure 6:
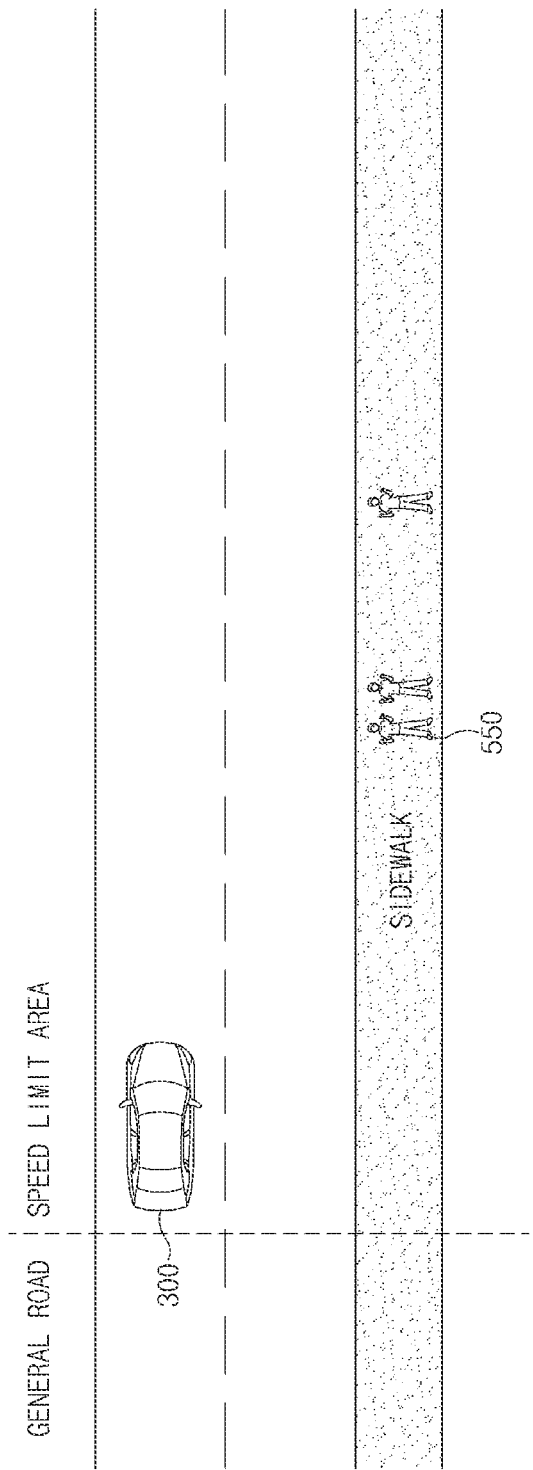

Subsequently, when the parked or stopped vehicle 500 is consecutively sensed as illustrated in FIG. 5, or when the pedestrian 550 is present on the sidewalk as illustrated in FIG. 6, the area, in which only the parked or stopped vehicle 500 is present, or the area in which only the pedestrian 550 is present may be set to a first dangerous area which is less dangerous.

Figure 7:
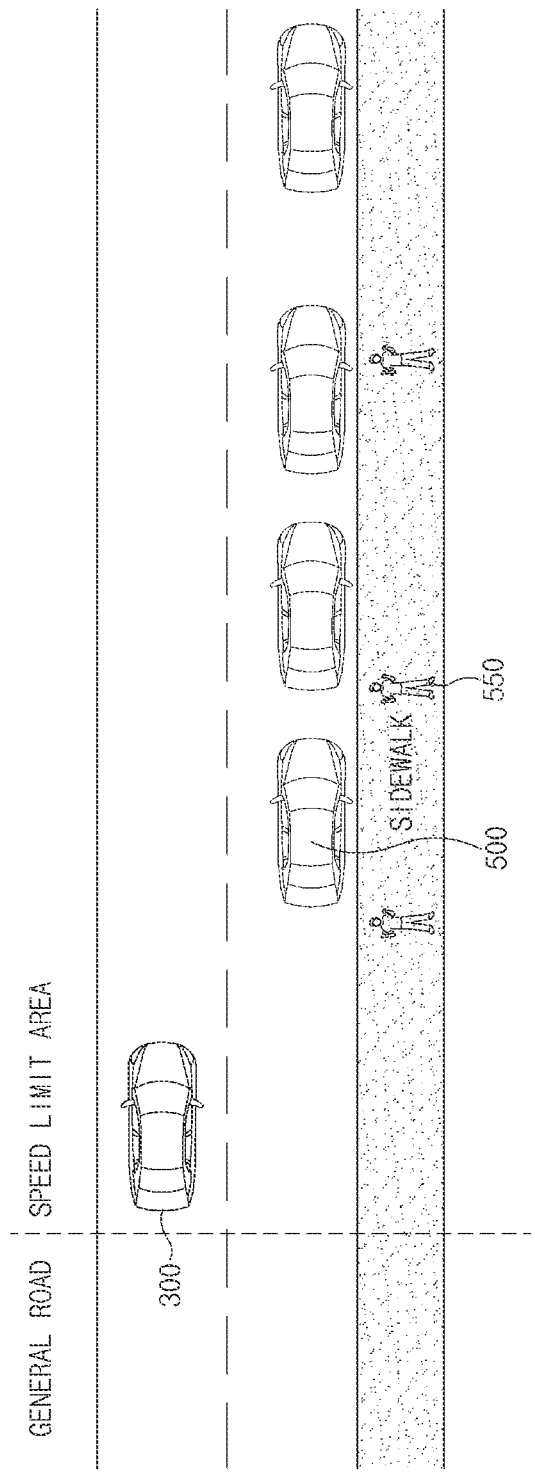

When the parked or stopped vehicle 500 is consecutively present while the pedestrian 550 is being present on the sidewalk as illustrated in FIG. 7, the vehicle controller 110 may set an area, in which both the parked or stopped vehicle 500 and the pedestrian 550 are present, to a second dangerous area which is more dangerous.

When the first dangerous area or the second dangerous area is set as described above, the sensitivity to the area less dangerous and the sensitivity to the area more dangerous may be differently compensated depending on dangerous areas.

In this case, when the first dangerous area or the second dangerous area is present in the low speed limit area, the vehicle controller 110 may notify the driver of the host vehicle 300 of that the first dangerous area or the second dangerous area is present, through the warning device 160.

Accordingly, when the second dangerous area, which is more dangerous, is present, the sensor 140 and the image sensor 150 of the host vehicle 300 may be corrected to be more sensitive. The vehicle controller 110 may control the parameter corrector 180 such that the photographing direction of the image sensor 150 faces the dangerous area 700, and the sensitivity of the sensor 140 may be corrected to be higher.

The image sensor 150 faces the first dangerous area and the second dangerous area in the low speed limit area. Accordingly, when the pedestrian 550 enters the road from the sidewalk, the vehicle controller 110 may more rapidly recognize the pedestrian 550. In addition, since the sensitivity of the sensor 140 is in a higher level, when the pedestrian 550 is present in front of the host vehicle 300, the time point to brake the host vehicle 300 becomes earlier and the braking force of the host vehicle 300 becomes stronger, thereby preventing the collision with the pedestrian 550 positioned in front of the host vehicle 300.

Meanwhile, when the host vehicle 300 senses that the host vehicle 300 deviates from the low speed limit area through the navigation 120, the vehicle controller 110 may restore the direction, which faces the first dangerous area and the second dangerous area, of the image sensor 150 to an original direction, and may restore the sensitivity of the sensor 140 to the original sensitivity.

Figure 8:
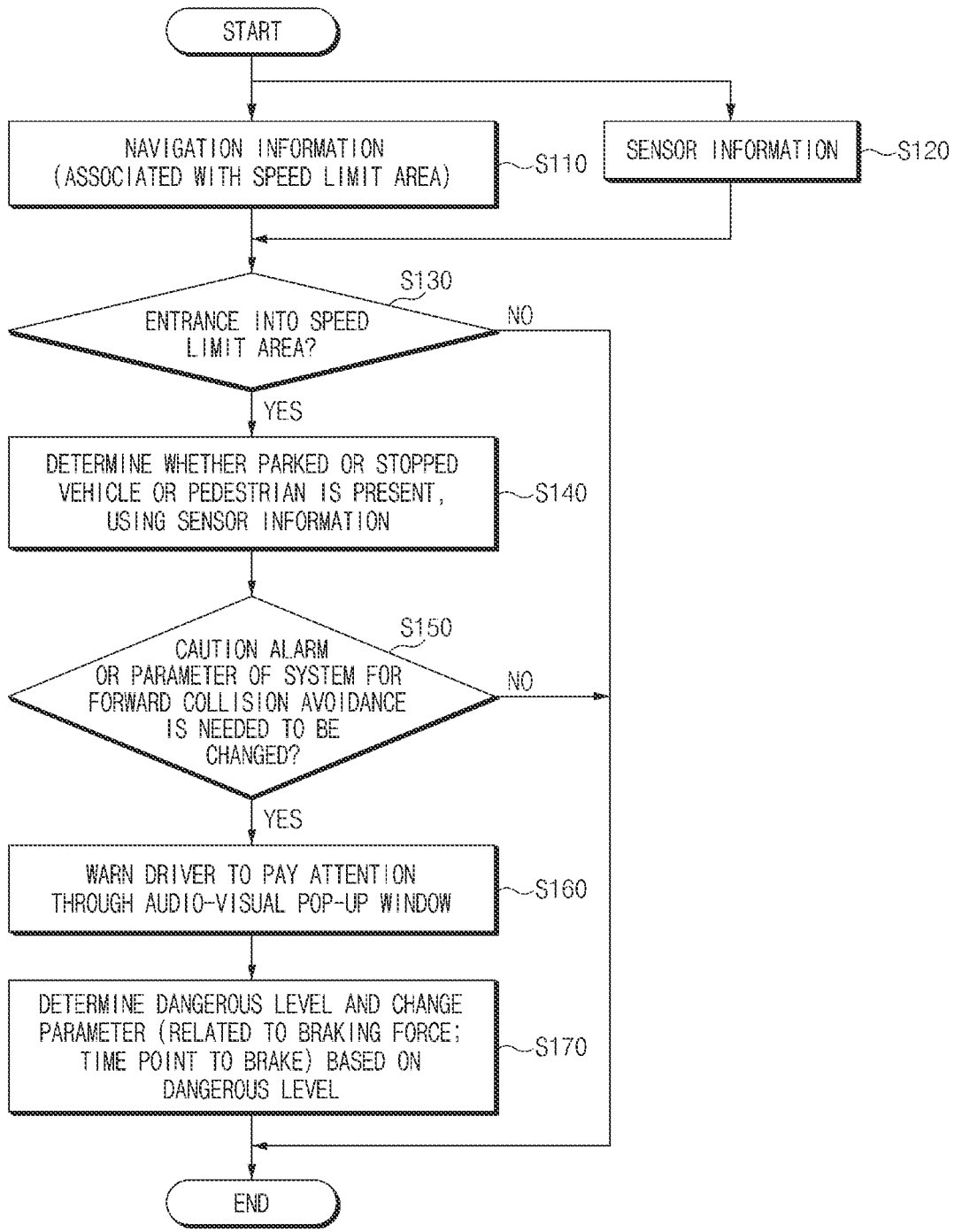
FIG. 8 is a flowchart illustrating a method for forward collision avoidance of a vehicle passing a low speed limit area, according to an embodiment of the present disclosure.

Hereinafter, a method for forward collision avoidance of a vehicle passing a low speed limit area according to another embodiment of the present disclosure will be described with reference to FIG. 8. FIG. 8 is a flowchart illustrating a method for forward collision avoidance of a vehicle passing a low speed limit area, according to another embodiment of the present disclosure.

Hereinafter, it is assumed that the system for the forward collision avoidance of the vehicle passing the low speed limit area of FIG. 1 performs a processor of FIG. 8.

First, the vehicle controller 110 may sense that the host vehicle 300 enters the low speed limit area, through the navigation 120 (S110 and S130), and may sense whether the parked or stopped vehicle on the shoulder of the road is present, through the sensor 140 (S120).

Thereafter, when the parked or stopped vehicle 500 is consecutively sensed, or when the pedestrian 550 on the sidewalk is sensed, the relevant area (an area in which the parked or stopped vehicle 500 is sensed or an area in which the pedestrian 550 is sensed) may be defined as the first dangerous area. When the parked or stopped vehicle 500 is consecutively sensed while the pedestrian 550 is sensed on the sidewalk, the relevant area may be defined as the second dangerous area (S140).

In this case, when a caution alarm or a parameter of the system for the forward collision avoidance is needed to be changed, as the first dangerous area or the second dangerous area is present (S150), the vehicle controller 110 may notify the driver of she host vehicle 300 of that the first dangerous area or the second dangerous area is present, through the warning device 160 (S160).

Next, the vehicle controller 110 may control the parameter corrector 180 such that the photographing direction of the image sensor 150 faces the first dangerous area or the second dangerous area and may correct the sensitivity of the sensor 140 to be higher.

Since the image sensor 150 is provided to face the direction of the first dangerous area and the second dangerous area, when the pedestrian 550 enters the road from the sidewalk, the vehicle controller 110 may more rapidly recognize the pedestrian 550. In addition, since the sensitivity of the sensor 140 is in a higher level, when the pedestrian 550 is present in front of the host vehicle 300, the vehicle controller 110 may change the time point to brake the host vehicle 300 to be earlier and change the braking force to be stronger, thereby preventing the collision with the pedestrian 550 positioned in front of the host vehicle 300 (S170).

Thereafter, when sensing that the host vehicle 300 deviates from the low speed limit area, through the navigation 120, the vehicle controller 110 may restore the direction of the image sensor 150, which faces the first dangerous area or the second dangerous area, no an original direction and may restore the sensitivity of the sensor 140 to original sensitivity.

As described above, according to the present disclosure, the dangerous level is defined with respect to when the parked or stopped vehicle is present or when the pedestrian is recognized on the sidewalk, such that audio-visual information or tactile information is provided to a driver during driving in the low speed limit area, thereby more rapidly coping with the collision with the pedestrian rushed out between the parked or stopped vehicles or rushed to the road out of the sidewalk by using dualized parameters (related to collision determination and braking) of the forward collision avoidance assist function, to reduce the collision with the pedestrian in the situation that many parked and stopped vehicles are present in the low speed limit area, and to reduce the burden of the driver by enhancing the collision avoidance function in the low speed limit area.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A system for vehicle forward collision avoidance through a reduced speed limit area, the system comprising:
a position providing device configured to provide information on a position of a host vehicle and detect the host vehicle entering the reduced speed limit area;
a sensor configured to detect whether an object is present in a vicinity of the host vehicle; and
a vehicle controller configured to:
set a risk area based on the detection of one or more motionless vehicles, one or more pedestrians or any combination thereof by utilizing a risk rank based on detection data provided by the sensor;
adjust a sensitivity of the sensor to be higher than an original sensitivity based on the set risk area;
in response to the detection of the host vehicle in the reduced speed limit area, adjust a forward collision avoidance (FCA) performance level of the host vehicle to be increased from an original FCA performance level; and
in response to the detection of the host vehicle deviating from the reduced speed limit area through the position providing device, restore the sensitivity of the sensor to the original sensitivity and restore the FCA performance level to the original FCA performance level.

2. The system of claim 1, wherein the vehicle controller is further configured to:
detect the host vehicle entering the reduced speed limit area, through the position providing device and set the risk area based thereon.

3. The system of claim 1, wherein the vehicle controller is further configured to:
set, to a first risk area, an area of the reduced speed limit area based on determining that any one of the one or more motionless vehicles or the one or more pedestrians are present; and
set, to a second risk area with a higher risk level than the first risk area, an area in which both the one or more motionless vehicles and the one or more pedestrians are present.

4. The system of claim 1, wherein the vehicle controller is further configured to:
differentially change the sensitivity of the sensor depending on the risk rank of the risk area.

5. The system of claim 4, wherein the vehicle controller is further configured to:
differentially change a force for braking the host vehicle, a time point to brake the host vehicle, or a combination thereof as the sensitivity of the sensor is differentially changed.

6. The system of claim 1, wherein, in response to the detection of one or more motionless vehicles, one or more pedestrians, or any combination thereof in the designated risk area, the vehicle controller is further configured to at least one of:
render sound or graphics; or
provide tactile information to a driver of the host vehicle.

7. The system of claim 1, wherein the one or more motionless vehicles are parked or stopped.

8. A controller-implemented method for vehicle forward collision avoidance through a reduced speed limit area, the method comprising:
detecting a host vehicle entering the reduced speed limit area, through a position providing device providing information on a position of the host vehicle;
detecting, in the reduced speed limit area, one or more motionless vehicles, one or more pedestrians or any combination thereof through a sensor detecting whether an object is present in a vicinity of the host vehicle;
setting a risk area based on the detection of one or more motionless vehicles, one or more pedestrians, or any combination thereof by utilizing a risk rank based on detection data provided by the sensor;
adjusting, by a vehicle controller, sensitivity of the sensor to be higher than an original sensitivity based on the set risk area;
in response to the detection of the host vehicle in the reduced speed limit area, adjusting a forward collision avoidance (FCA) performance level of the host vehicle to be increased from an original FCA performance level; and
in response to the detection of the host vehicle deviating from the reduced speed limit area, restoring the sensitivity of the sensor to the original sensitivity, and restoring FCA performance level to the original FCA performance level.

9. The method of claim 8, wherein the detecting of the host vehicle entering the reduced speed limit area comprises:
detecting the host vehicle entering the reduced speed limit area, through the position providing device.

10. The method of claim 8, wherein the detecting in the reduced speed limit area of the motionless vehicle or the pedestrian comprises:
setting, to a first risk area, an area of the reduced speed limit area based on determining that any one of the one or more motionless vehicles or the one or more pedestrians are present; and
setting, to a second risk area with a higher risk level than the first risk area, an area in which both the one or more motionless vehicles and the one or more pedestrians are present.

11. The method of claim 8, wherein the adjusting by the vehicle controller of the sensitivity of the sensor comprises:
differentially changing the sensitivity of the sensor, depending on the risk rank of the risk area.

12. The method of claim 11, wherein the adjusting by the vehicle controller of the sensitivity of the sensor further comprises:
differentially changing a force for braking the host vehicle, a time point to brake the host vehicle, or a combination thereof as the sensitivity of the sensor is differentially changed.

13. The method of claim 8, wherein, in response to the detection of the one or more motionless vehicles, the one or more pedestrians in the risk area, or any combination thereof in the designated risk area, the adjusting by the vehicle controller of the sensitivity of the sensor comprises at least one of:
rendering sound or graphics; or
providing tactile information to a driver of the host vehicle.

14. The method of claim 9, wherein the one or more motionless vehicles are parked or stopped.

15. A method comprising:
determining that a vehicle has entered a reduced-speed area, and based thereon, using a sensor to detect whether a pedestrian or a stopped vehicle is present;
setting a first risk area based on the sensor detecting one or more pedestrians or one or more motionless vehicles in the first risk area;

setting a second risk area based on the sensor detecting one or more pedestrians and one or more motionless vehicles in the second risk area;

based on the first risk area being set, making a first adjustment to a parameter of a forward collision avoidance (FCA) system; and based on the second risk area being set, making a second adjustment to the parameter of the FCA system, wherein the first adjustment to the parameter of the FCA system is different from the second adjustment to the parameter of the FCA system.

* * * * *